United States Patent [19]

Shimura

[11] Patent Number: 4,829,181
[45] Date of Patent: May 9, 1989

[54] METHOD OF RECOGNIZING SUBDIVISION PATTERN OF RADIATION IMAGES

[75] Inventor: Kazuo Shimura, Kanagawa, Japan

[73] Assignee: Fuji Photo Film Co., Ltd., Kanagawa, Japan

[21] Appl. No.: 181,946

[22] Filed: Apr. 15, 1988

[30] Foreign Application Priority Data

Apr. 16, 1987 [JP] Japan .................................. 62-93632

[51] Int. Cl.[4] ............................................. G03B 42/02
[52] U.S. Cl. ............................. 250/327.2; 364/413.13
[58] Field of Search .................. 250/327.2 D, 327.2 F, 250/484.1 B; 364/413.13

[56] References Cited

U.S. PATENT DOCUMENTS

| 4,258,264 | 3/1981 | Kotera et al. | 250/484.1 |
| 4,346,295 | 8/1982 | Tanaka et al. | 250/327.2 |
| 4,476,497 | 10/1984 | Oshikoshi et al. | 358/298 |
| 4,527,060 | 7/1985 | Suzuki et al. | 250/327.2 |

FOREIGN PATENT DOCUMENTS

| 0170270 | 2/1986 | European Pat. Off. | 250/327.2 |
| 56-11395 | 2/1981 | Japan | 250/327.2 |
| 58-67240 | 4/1983 | Japan . | |
| 58-67242 | 4/1983 | Japan . | |
| 61-39039 | 2/1986 | Japan . | |
| 62-15538 | 1/1987 | Japan . | |

Primary Examiner—Janice A. Howell
Assistant Examiner—Constantine Hannaher
Attorney, Agent, or Firm—Sughrue, Mion, Zinn, Macpeak & Seas

[57] ABSTRACT

A method of recognizing a subdivision pattern of radiation images comprises the steps of, in the case where subdivision image recording has been carried out by exposing each of a plurality of predetermined subdivisions on a stimulable phosphor sheet to radiation, detecting prospective edge points, which are considered to be an edge of a subdivision line between the subdivisions, from image signals detected from a stimulable phosphor sheet region as the boundary between the subdivisions, and discriminating whether the prospective edge points stand or do not stand in a straight line. An image subdivision pattern on the stimulable phosphor sheet is recognized by judging that the subdivision line is present in the case where the prospective edge points stand in a straight line, and judging that no subdivision line is present in the case where the prospective edge points do not stand in a straight line.

4 Claims, 5 Drawing Sheets

METHOD OF RECOGNIZING SUBDIVISION PATTERN OF RADIATION IMAGES

BACKGROUND OF THE INVENTION

1. Field of Invention

This invention relates to a method of automatically recognizing a subdivision pattern of radiation images stored on a stimulable phosphor sheet.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to a stimulating ray beam such as a laser beam which causes the stimulable phosphor sheet to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording medium such as a photographic film, a display device such as a cathode ray tube (CRT), or the like.

In the aforesaid radiation image recording and reproducing system, in order to eliminate various influences caused by variations in image recording conditions and/or to obtain a radiation image having a high image quality or a high diagnostic efficiency and accuracy, it is desired to ascertain such image input conditions of the radiation image stored on the stimulable phosphor sheet as, for example, the level of radiation dose used for image recording, or the image input pattern which is determined by the portion of the object (e.g. the chest or the abdomen of the human body) or the image recording method used, such as plain image recording or contrasted image recording, before reproducing the radiation image to a visible image, and then to adjust the read-out gain to an appropriate value based on the ascertained image input conditions or the image input pattern. The image input conditions and the image input pattern will hereinafter be simply referred to as the image input information when they are referred to generically. It is also desired to adjust the scale factor to optimize the resolution in accordance with the contrast of the image input pattern.

Ascertaining of the image input information may be carried out prior to the visible image reproduction by use of the method as disclosed in Japanese Unexamined Patent Publication No. 58(1983)-67240. In the disclosed method, a read-out operation for ascertaining the image input information of a radiation image stored on a stimulable phosphor sheet (hereinafter referred to as the preliminary read-out) is carried out in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the readout gain and/or the scale factor is adjusted to an appropriate value, and/or an appropriate signal processing is conducted, on the basis of the image input information obtained by the preliminary read-out.

Various methods may be used for approximately ascertaining the image input information on the stimulable phosphor sheet from preliminary read-out image signals obtained by the aforesaid preliminary read-out. One method is to utilize a histogram of the preliminary read-out image signals. Specifically, the image input information can be ascertained from, for example, a characteristic value such as the maximum signal value, the minimum signal value, or a signal value at a point where the frequency is the maximum in the histogram. Therefore, a visible radiation image having an improved image quality, particularly a high diagnostic efficiency and accuracy, can be reproduced by adjusting the read-out conditions such as the read-out gain and the scale factor and/or the image processing conditions on the basis of the histogram.

On the other hand, in the course of radiation image recording, it is often desired that portions of the object not related to diagnosis or the like be prevented from exposure to a radiation. Further, when the object portions not related to diagnosis or the like are exposed to a radiation, the radiation is scattered by such portions to the portion related to diagnosis or the like, and the contrast and resolution are adversely affected by the scattered radiation. Therefore, in many cases, the irradiation field is limited to an area smaller than the overall recording region on the stimulable phosphor sheet when a radiation image is recorded.

However, in the case where the image input information stored on the stimulable phosphor sheet is ascertained in the manner as mentioned above, the problem as described below arises. When an irradiation field is limited to an area smaller than the image recording region on the stimulable phosphor sheet and the preliminary readout is carried out over an area markedly larger than the irradiation field, for example, over the overall image recording region on the stimulable phosphor sheet, the image input information actually stored within the irradiation field is ascertained incorrectly. Specifically, in the aforesaid case, since the preliminary read-out image signals at regions outside of the irradiation field are also included in the histogram, the histogram does not accurately represents the actual image input information stored within the irradiation field.

The applicant have proposed various methods of recognizing an irradiation field as disclosed in, for example, Japanese Unexamined Patent Publication No. 61(1986)-39039. The aforesaid problem can be eliminated by automatically recognizing the irradiation field by use of the proposed methods, and carrying out the preliminary read-out only for the region thus recognized.

On the other hand, in the course of radiation image recording on the stimulable phosphor sheet, subdivision image recording is often carried out. In subdivision image recording, the recording region on the stimulable phosphor sheet is divided into a plurality of predetermined subdivisions, and the respective subdivisions are exposed to radiation for image recording. Subdivision image recording is economical since, for example, when an image of a small object portion is recorded on a large stimulable phosphor sheet, images of a plurality of object portions may be recorded on a single stimulable phosphor sheet. Also, the radiation image recording and read-out processing speed becomes high.

Figure 2:
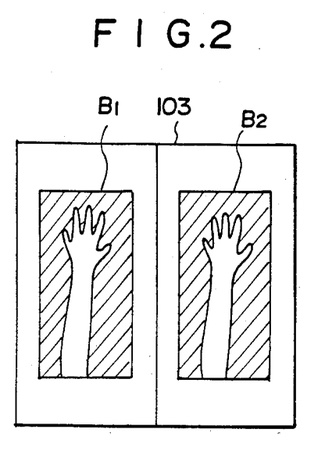
FIGS. 2 and 3 are explanatory views showing the recording conditions of radiation image information on stimulable phosphor sheets.

However, in the case where irradiation fields are limited when subdivision image recording as mentioned above is carried out, the respective irradiation fields become separated from each other. FIG. 2 shows the recording condition on a single stimulable phosphor sheet 103 in the case where subdivision image recording is carried out by dividing the recording region on the stimulable phosphor sheet 103 into two subdivisions, and the irradiation field is limited in each subdivision image recording step. In FIG. 2, B1 and B2 denote the respective irradiation fields. In most conventional methods of recognizing an irradiation field, recognition of the irradiation field is carried out on the assumption that a single irradiation field is present on a single stimulable phosphor sheet. With such methods, the irradiation fields as shown in FIG. 2 are recognized incorrectly. On the other hand, a method of automatically recognizing a plurality of irradiation fields on a single stimulable phosphor sheet has also been proposed. However, with the proposed method, the algorithm for recognition of irradiation fields becomes very complicated, and a very expensive apparatus is necessary for executing the method.

In the case where information on the positions of the respective subdivisions are instructed by manually entering the information representing a subdivision pattern on the stimulable phosphor sheet to an irradiation field recognizing apparatus in the course of recognition of irradiation fields, processing for detecting a single irradiation field in each subdivision may be carried out, and the problem that the algorithm for recognition of the irradiation fields becomes very complicated can be eliminated. However, it is very troublesome to manually enter the subdivision pattern each time radiation image read-out from the stimulable phosphor sheet is to be carried out.

SUMMARY OF THE INVENTION

The primary object of the present invention is to provide a method of automatically recognizing a subdivision pattern of radiation images stored on a stimulable phosphor sheet.

Another object of the present invention is to provide a method of recognizing a subdivision pattern of radiation images, which enables reproduction of a visible radiation image suitable for viewing, particularly for diagnostic purposes.

The present invention provides a method of recognizing a subdivision pattern of radiation images, which comprises the steps of, in the course of exposing a stimulable phosphor sheet carrying radiation image information of an object stored thereon by radiation image recording to stimulating rays which cause the stimulable phosphor sheet to emit light in proportion to the stored radiation energy, and photoelectrically detecting the emitted light by use of a light detection means to obtain image signals representing the radiation image information:

(i) in the case where subdivision image recording has been carried out by exposing each of a plurality of predetermined subdivisions on said stimulable phosphor sheet to radiation, detecting prospective edge points, which are considered to be an edge of a subdivision line between said subdivisions, from said image signals at a stimulable phosphor sheet region as the boundary between said subdivisions, (ii) discriminating whether said prospective edge points stand or do not stand in a straight line, and (iii) recognizing an image subdivision pattern on said stimulable phosphor sheet by judging that the subdivision line is present in the case where said prospective edge points stand in a straight line, and judging that no subdivision line is present in the case where said prospective edge points do not stand in a straight line.

In the case where it is discriminated by processing in the manner as mentioned above that no subdivision line is present, it may be recognized that no subdivision was carried out in the course of image recording. Such a case is equivalent to recognition of the pattern of null subdivision. Therefore, the recognition of a subdivision pattern in accordance with the present invention also embraces the case of recognition of such a recording condition.

The radiation dose is markedly higher or lower at the subdivision line than at the region around the subdivision line. Therefore, the subdivision line is reproduced as a black line or a white line in the visible radiation image reproduced based on the read-out image signals. Specifically, in the course of subdivision image recording, image recording is carried out by covering the region on the stimulable phosphor sheet outside of the image recording region by a radiation shielding plate. In the case where the radiation shielding plate is positioned so that the regions covered by the radiation shielding plate overlap slightly at the boundary between the adjacent image recording regions in two radiation image recording steps carried out sequentially, the overlapping region is exposed to no radiation in the two radiation image recording steps, and therefore appears as a white line in the reproduced visible radiation image. On the other hand, in the case where the radiation shielding plate is positioned so that the regions covered by the radiation shielding plate is slightly spaced from each other with a region uncovered at the boundary between the adjacent image recording regions in the two radiation image recording steps carried out sequentially, radiation directly impinges upon said uncovered region in the two radiation image recording steps, and therefore said uncovered region appears as a black line in the reproduced visible radiation image.

With the method of recognizing a subdivision pattern of radiation images in accordance with the present invention, a subdivision pattern on the stimulable phosphor sheet can be recognized reliably, and the image input information on the object can be detected accurately for the image stored at each subdivision, thereby to adjust the read-out conditions in the final read-out to appropriate values and/or to carry out image processing appropriately. Accordingly, with the method in accordance with the present invention, it is possible to obtain a reproduced visible radiation image suitable for viewing, particularly for diagnostic purposes.

DESCRIPTION OF THE PREFERRED EMBODIMENTS

The present invention will hereinbelow be described in further detail with reference to the accompanying drawings.

Figure 1:
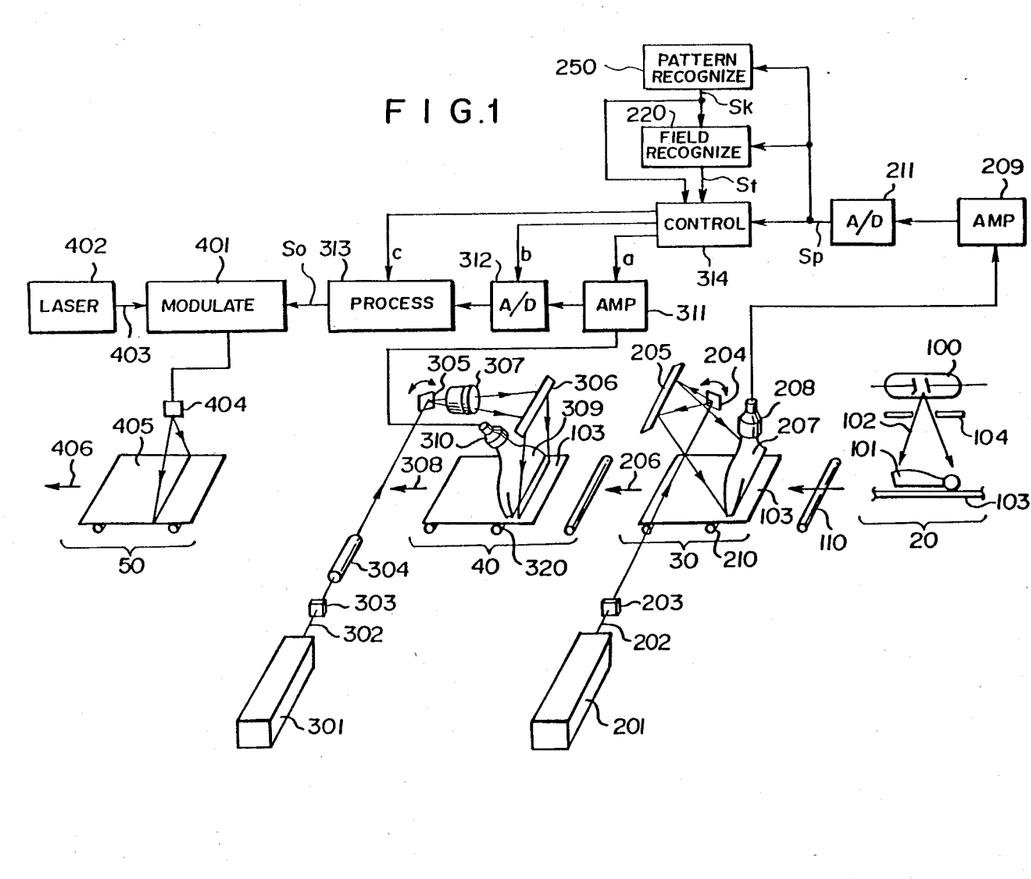
FIG. 1 is a schematic view showing the radiation image recording and reproducing system wherein readout of radiation image information is carried out by recognizing the subdivision pattern by the method in accordance with the present invention.

Referring to FIG. 1, a radiation image recording and reproducing system basically comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanated thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. in the sub-scanning direction) by a sheet conveyance means 210 constituted by conveyor rollers or the like, and thus the overall surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the level of the stimulation energy of the laser beam 202 for preliminary read-out is lower than the level of the stimulation energy of the laser beam for the final read-out carried out at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals carrying the image input information stored on the stimulable phosphor sheet 103, and amplified by an amplifier 209. The signals generated by the amplifier 209 are digitized by an A/D converter 211, and sent as preliminary read-out image signals Sp to a final read-out control circuit 314 at the final read-out section 40. On the basis of the image input information which the preliminary read-out image signals Sp represent, the final read-out control circuit 314 calculates a read-out gain setting value (a), a scale factor setting value (b), and a reproduced image processing condition setting value (c). The preliminary read-out image signals Sp are also sent to an irradiation field recognition circuit 220 and a subdivision pattern recognizing circuit 250 which will be described in detail later.

After the preliminary read-out is finished, the stimulable phosphor sheet 103 is sent to the final read-out section 40. At this section, a laser beam 302 emanated by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the 10 light deflector 305 and the plane reflection mirror 306 is disposed an $f\theta$ lens 307 for maintaining the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signals are fed to an A/D converter 312 which converts the electric signals into digital signals by use of a scale factor which has been adjusted by the scale factor setting value (b) to suit the width of signal fluctuation. The digital signals thus obtained are fed to a signal processing circuit 313, in which they are subjected to signal processing (image processing) based on the reproduced image processing condition setting value (c) so as to obtain a visible radiation image suitable for viewing, particularly for diagnostic purposes, and are output as read-out image signals (final read-out image signals) So.

The final read-out image signals So generated by the signal processing circuit 313 are fed to a light modulator 401 at the image reproducing section 50. At he image reproducing section 50, a laser beam 403 emanated by a reproducing laser beam source 402 is modulated by the light modulator 401 on the basis of the final read-out image signals So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signals o is recorded on the photosensitive material 405. For reproducing the radiation image, it is possible to use any other appropriate method such as the aforesaid displaying on a CRT.

Figure 5:
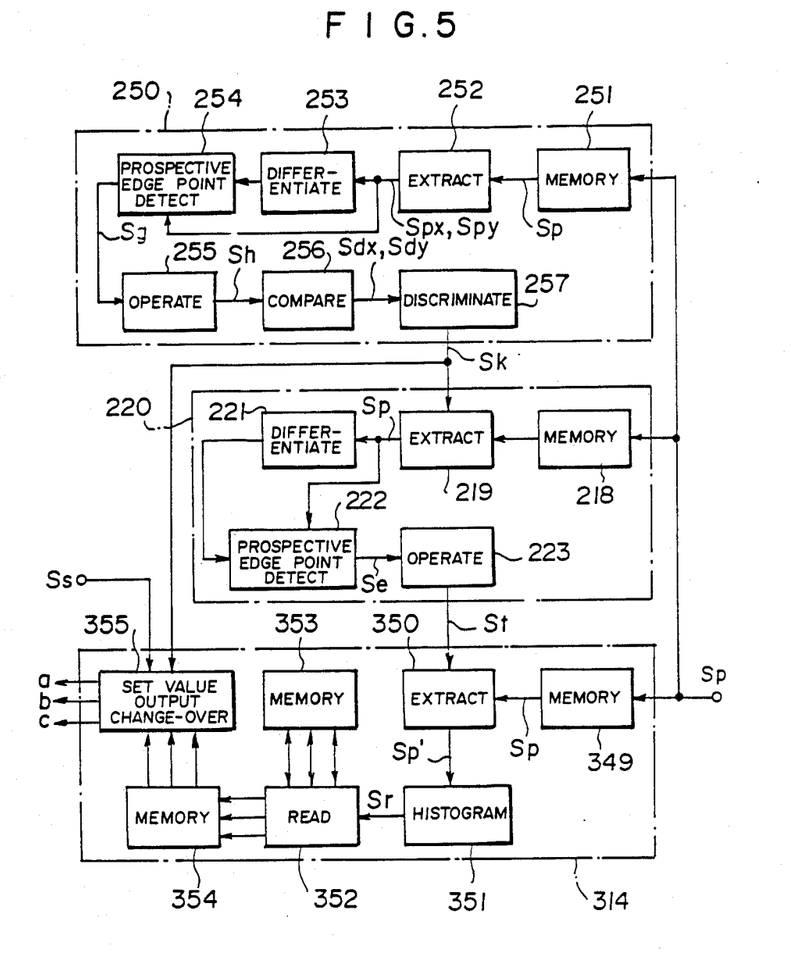
FIG. 5 is a block diagram showing a part of the radiation image recording and reproducing system shown in FIG. 1.

A technique of accurately adjusting the read-out gain setting value (a), the scale factor setting value (b) and the image processing condition setting value (c) even though subdivision image recording has been carried out on the stimulable phosphor sheet 103 and the irradiation fields B1 and B2 are limited in the respective subdivisions as shown in FIG. 2 will hereinbelow be described with reference to FIG. 5. As shown in FIG. 5, the control circuit 314 comprises a frame memory 349, a signal extracting section 350, a histogram analysis section 351, a read section 352, memories 353 and 354, and a setting value output change-over section 355. The aforesaid preliminary read-out image signals Sp are stored in the frame memory 349, and then sent to the signal extracting section 350 which extracts preliminary read-out image signals Sp' only within a region specified as will be described later. The preliminary read-out image signals Sp' are sent from the signal extracting section 350 to the histogram analysis section 351. The histogram analysis section 351 creates a histogram of the preliminary read-out image signals Sp', calculates the maximum value, the minimum value, the signal value at which the frequency is the maximum in the histogram, or the like, and sends a signal Sr representing the calculated value to the read section 352. The memory 353 stores the read-out gain setting value (a), the scale factor setting value (b), and the image processing condition setting value (c) suitable for the aforesaid maximum value, the minimum value, the signal value at which the frequency is the maximum, or the like. The read section 352 reads the setting values (a), (b) and (c) suitable for the signal Sr from the memory 353, and has the setting values (a), (b) and (c) stored in the memory 354. As will be described later, two values or four values may be calculated as each of the setting values (a), (b) and (c). In this case, the setting value output change-over section 355 changes over the setting values in synchronization with the scanning of the laser beam 302 for the final read-out, and sends them respectively to the amplifier 311, the A/D converter 312, and the signal processing circuit 313. Change-over and output of the two values or the four values as each of the setting values (a), (b) and (c) will be described in detail later.

Figure 3:
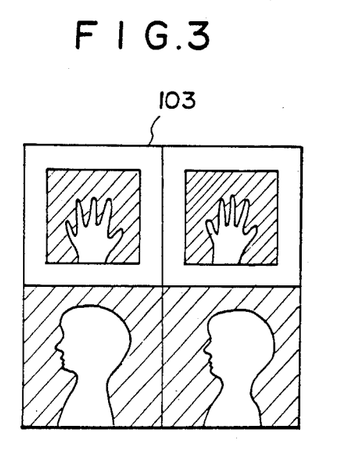
Figure 4:
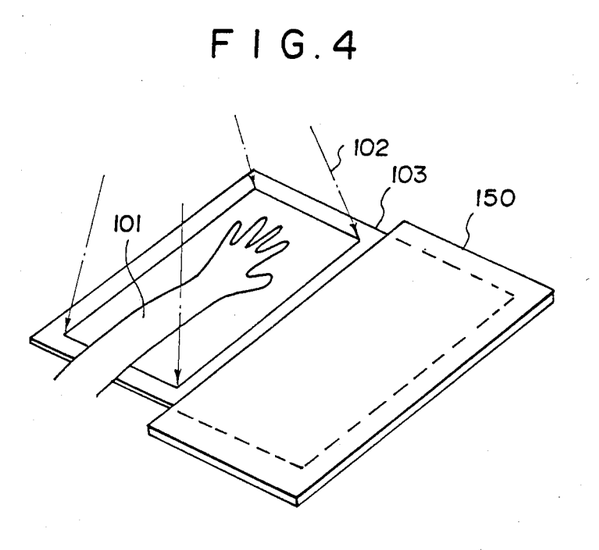
FIG. 4 is a perspective view showing the subdivision image recording.

Signal extraction by the signal extracting section 350 will now be described below. In this embodiment, two-on-one subdivision image recording as shown in FIG. 2 and four-on-one subdivision image recording as shown in FIG. 3 may be carried out as well as the recording of a single radiation image on a single stimulable phosphor sheet 103. Also, in the case of the recording of a single radiation image on a single stimulable phosphor sheet 103 and in the case of the subdivision image recording, the radiation image recording may often be carried out by limiting the irradiation field by use of the irradiation field stop 104. As shown in FIG. 4, the subdivision image recording is carried out by covering the region outside of the image recording region (the one-half region in the case of the two-on-one subdivision image recording) on the stimulable phosphor sheet 103 by use of a shielding plate 150 formed of a lead plate or the like. As mentioned above, a subdivision line which is reproduced as a white line or a black line is recorded at the boundary between the subdivisions. The subdivision pattern recognizing circuit 250 recognizes the subdivision pattern, i.e. the four-on-one subdivision pattern, the two-on-one subdivision pattern or the null subdivision, which was employed in the image recording step, and sends a signal Sk representing the recognized subdivision pattern to the irradiation field recognizing circuit 220 and the final read-out control circuit 314.

Figure 6:
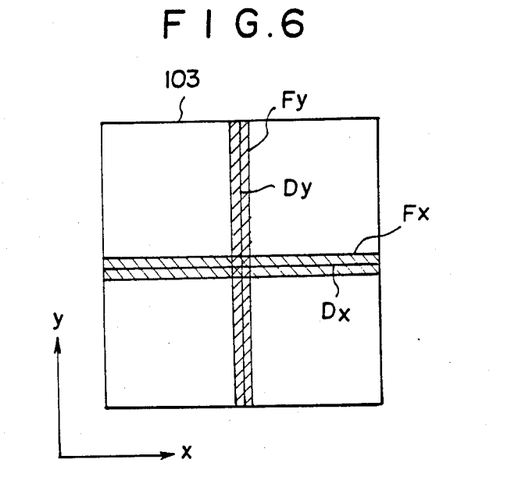
FIG. 6 is an explanatory view showing the subdivision lines and boundary regions between subdivisions on a stimulable phosphor sheet.

Recognition of the subdivision pattern by the subdivision pattern recognizing circuit 250 will hereinbelow be described in detail. The preliminary read-out image signals Sp are stored in a frame memory 251 of the subdivision pattern recognizing circuit 250. From the stored preliminary read-out image signals Sp, a signal extracting section 252 extracts image signals Spx at a region Fx extending in the horizontal direction at the middle of the stimulable phosphor sheet 103, as viewed in the vertical direction, as shown in FIG. 6. The signal extracting section 252 feeds the extracted image signals Spx to a differentiation processing section 253 and a prospective edge point signal detecting section 254. As is clear from FIG. 6, the region Fx is the sheet region which constitutes the boundary between the subdivisions in the case where the four-on-one subdivision image recording has been carried out. The differentiation processing section 253 differentiates the digital image signals Spx in the y axis direction in FIG. 6. Differentiation may be one-dimensional differentiation of first or higher order, and may be two-dimensional differentiation of first or higher order. In the case of a discretely sampled image, differentiation is equivalent to calculation of differences between the image signals which are present in the vicinity. The prospective edge points may also be detected by a method different from differentiation processing, for example, a pattern matching technique, or a method wherein application to a straight line is carried out and the edge is discriminated based on the inclination of the straight line. In this embodiment, the differentiation processing section 253 calculates the aforesaid differences. Also, the prospective edge point signal detecting section 254 extracts the image signals Spx at the points where the differences exceed a predetermined value, calculates the positions of the picture elements corresponding to the extracted image signals Spx, and sends signals Sg representing the positions of the picture elements to an operating section 255. Most of the image signals Spx extracted in the manner as mentioned above represent the edge of the subdivision line, i.e. the subdivision line denoted by Dx in FIG. 6 in this case. The aforesaid differentiation processing and the detection of differences are described in detail in Japanese Unexamined Patent Publication No. 61(1986)-39039.

Figure 7A:
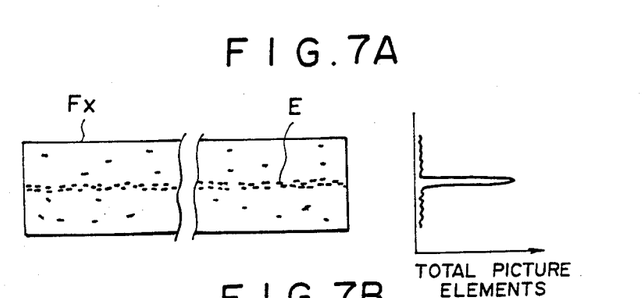
FIGS. 7A and 7B are explanatory views showing the prospective edge points and distributions thereof at the boundary between subdivisions.
Figure 7B:
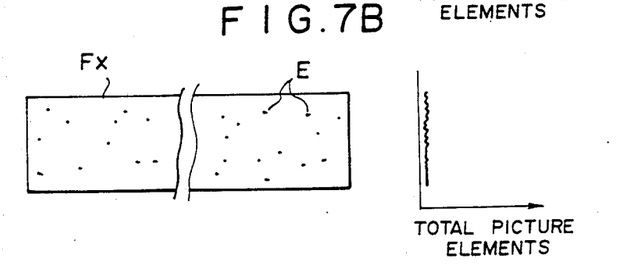

The operating section 255 adds the picture elements (prospective edge points) at the positions represented by the signals Sg in the x axis direction in FIG. 6, i.e. along the same y coordinate, and calculates the total number of said picture elements. The maximum total number of said picture elements attains a very large value in the case where the prospective edge points E which the signals Sg represent stand in a horizontal straight line as shown in FIG. 7A, and attains a very small value in the case where the prospective edge points E are present discretely as shown in FIG. 7B. A signal Sh representing the maximum total number of said picture elements is sent to a comparing section 256. The comparing section 256 compares the maximum total number of said picture elements represented by the signal Sh with a predetermined value. In the case where the maximum total number of said picture elements is larger than the predetermined value, the comparing section 256 judges that the prospective edge points stand in a straight line, i.e. that the subdivision line Dx shown in FIG. 6 is present, and sends a signal Sdx representing the presence of the subdivision line Dx to a discriminating section 257.

After processing as mentioned above is finished, the signal extracting section 252 extracts image signals Spy at a region Fy extending vertically at the middle of the stimulable phosphor sheet 103, as viewed in the horizontal direction, as shown in FIG. 6. The signal extracting section 252 feeds the extracted image signals Spy to the differentiation processing section 253 and the prospective edge point signal detecting section 254. As is clear from FIG. 6, the region Fy is the sheet region which constitutes the boundary between the subdivisions in the case where the two-on-one or four-on-one subdivision image recording has been carried out. Thereafter, processing is carried out in the same manner as mentioned above. In the case where the comparing section 256 judges that a subdivision line Dy is present in the region Fy as shown in FIG. 6, the comparing section 256 sends a signal Sdy representing the presence of the subdivision line Dy to the discriminating section 257.

The discriminating section 257 judges that the subdivision image recording was carried out in the four-on-one subdivision pattern in the case where both the signal Sdx and the signal Sdy are received, that the subdivision image recording was carried out in the two-on-one subdivision pattern in the case where the signal Sdx alone is received, and that image recording was carried out in the null subdivision pattern, i.e. in the one-on-one pattern, in the case where neither of the signal Sdx and the signal Sdy is received. The discriminating section 257 sends the signal Sk representing the subdivision pattern to the irradiation field recognizing circuit 220 and the final read-out control circuit 314.

Figure 8:
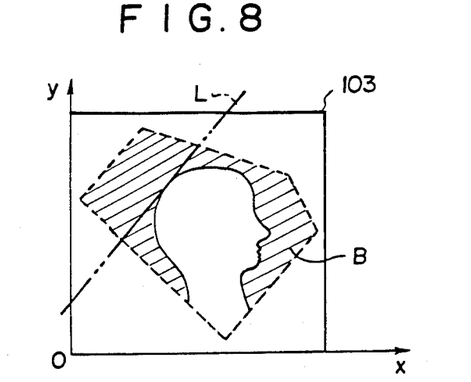
FIGS. 8, 9 and 10 are explanatory views showing an embodiment of the method of recognizing a subdivision pattern of radiation images in accordance with the present invention.

The irradiation field recognizing circuit 220 processes to recognize a single irradiation field in each of the subdivisions represented by the signal Sk, and sends a signal St representing the irradiation field in each subdivision to the signal extracting section 350 of the final read-out control circuit 314. Processing for recognizing a single irradiation field in a single subdivision on the stimulable phosphor sheet 103 can be carried out by use of an algorithm simpler than in the case where a plurality of irradiation fields are to be recognized in the overall region on the stimulable phosphor sheet 103. Such processing for recognizing a single irradiation field can be carried out by use of a method as disclosed in, for example, Japanese Unexamined Patent Publication No. 61(1986)-39039. However, in this embodiment, a method capable of accurately recognizing an irradiation field having an irregular polygonal shape is carried out by the utilization of Hough transformation. The irradiation field recognizing circuit 220 for carrying out such a method will now be described in detail. First, the case where the subdivision pattern which the signal Sk represent is the null subdivision pattern, i.e. the one-on-one subdivision pattern, will be described below. In this case, a signal extracting section 219 of the irradiation field recognizing circuit 220 which receives the signal Sk feeds all of the preliminary read-out image signals Sp stored in a frame memory 218 to a differentiation processing section 221 and a prospective edge point signal detecting section 222. The differentiation processing section 221 and the prospective edge point signal detecting section 222 are respectively of the same types as the differentiation processing section 253 and the prospective edge point signal detecting section 254 of the subdivision pattern recognizing circuit 250. The differentiation processing section 221 differentiates the digital preliminary read-out image signals Sp in a predetermined array direction of the picture elements, and calculates the differences as mentioned above. Also, the prospective edge point signal detecting section 222 extracts the preliminary read-out image signals Sp at the points where the differences exceed a predetermined value, calculates the positions of the picture elements corresponding to the extracted preliminary read-out image signals Sp, and sends signals Se representing the positions of the picture elements to an operating section 223. In this case, most of the preliminary read-out image signals Sp extracted in the manner as mentioned above represent the edges of the irradiation field B on the stimulable phosphor sheet 103 as shown in FIG. 8. Detection of the image edges may also be carried out by use of a method as proposed in, for example, Japanese Patent Application No. 60(1985)155845. As shown in FIG. 8, the positions of the picture elements are expressed on the x-y orthogonal coordinate system on the stimulable phosphor sheet 103.

Figure 9:
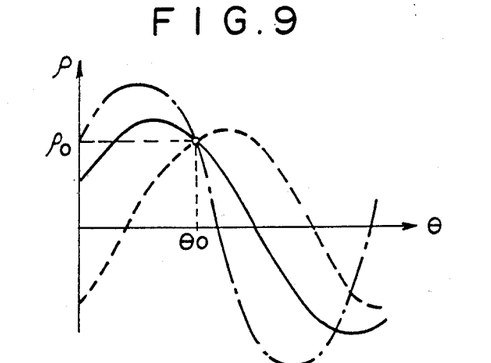

In the case where the coordinates of the picture element positions (prospective edge points) which the signals Se represent are taken as (xo,yo), the operating section 223 calculates the curves expressed as $$\rho = xo \cos\theta + yo \sin\theta$$

with xo and yo being constants, for all of the prospective edge point coordinates (xo,yo). FIG. 9 shows the curves thus obtained, and the curves are obtained in a number equal to the number of the prospective edge point coordinates (xo,yo).

Then, the operating section 223 calculates an intersection ($\rho o, \theta o$) of the curves in a number not smaller than a predetermined number Q among a plurality of the aforesaid curves. Because of errors of the prospective edge point coordinates (xo,yo), many curves rarely intersect exactly at a single point. Therefore, by way of example, in the case where intersections of multiple sets of two curves are present spaced from one another by small distances not longer than a predetermined distance, the middle of the group of the intersections is taken as the aforesaid intersection ($\rho o, \theta o$). Then, from the intersection ($\rho o, \theta o$), the operating section 223 calculates a straight line expressed as $$\rho o = x \cos\theta o + y \sin\theta o$$

on the x-y orthogonal coordinate system. The straight line thus calculated extends along a plurality of the prospective edge point coordinates, (xo,yo). It often occurs that bone edges or other image portions at which the image density changes sharply in the irradiation field B are also detected as the prospective edge points. Therefore, as shown in FIG. 8, there is the risk of such a straight line L that connects said prospective edge points with the prospective edge points at the irradiation field contour being obtained. However, in the case where the aforesaid predetermined number Q is adjusted to be substantially large (for example, 20 or a larger value), the straight line L is not obtained, but instead only the straight line representing the irradiation field contour along many prospective edge points is obtained.

Figure 10:
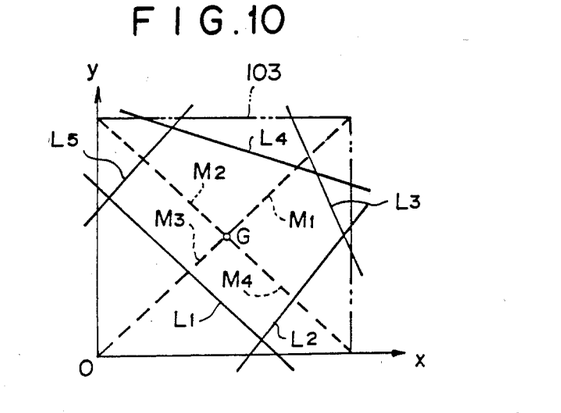

In the case where the prospective edge points are distributed as shown in FIG. 8, the straight lines as shown in FIG. 10 are obtained. The operating section 223 then detects the region surrounded by a plurality of straight lines L1, L2, L3, . . . , Ln obtained in this manner, and recognizes said region as the irradiation field B. Specifically, for example, the region is recognized in the manner as mentioned below. The operating section 223 stores line segments M1, M2, M3, . . . , Mm connecting the corners of the stimulable phosphor sheet 103 with the center G (four line segments in the case where the stimulable phosphor sheet 103 is rectangular), and detects the presence or absence of an intersection of each of the line segments M1 to Mm and each of the straight lines L1 to Ln. In the case where the intersection is present, the operating section 223 discards the plane on the side including the corner of the stimulable phosphor sheet 103, which is one of the two planes into which the stimulable phosphor sheet 103 is divided by the straight line. This operation is carried out for all of the straight lines L1 to Ln and the line segments M1 to Mm, and the region surrounded by the straight lines L1 to Ln is maintained undiscarded. The region thus obtained is recognized as the irradiation field B.

The operating section 223 sends the signal St representing the irradiation field B recognized in the manner as mentioned above to the signal extracting section 350 of the final read-out control circuit 314. The signal extracting section 350 extracts the image signals at the region which the signal St represents from the preliminary read-out image signals Sp stored in the frame memory 349, and sends the extracted image signals to the histogram analysis section 351. Therefore, histogram analysis at the histogram analysis section 351 is carried out only for the region on the stimulable phosphor sheet 103 that was actually exposed to radiation, and the aforesaid setting values (a), (b) and (c) are adjusted to be suitable for the actual image input information.

In the case where the irradiation field is not limited on a single stimulable phosphor sheet 103, the setting values (a), (b) and (c) are adjusted based on the preliminary read-out image signals Sp at the overall region on the stimulable phosphor sheet 103. This also applies to the case where the irradiation field is not limited in each of the subdivisions. In the latter case, the setting values (a), (b) and (c) are adjusted based on the preliminary read-out image signals Sp at the overall region of each subdivision.

In the case of the null subdivision image recording on the stimulable phosphor sheet 103, a single value is obtained for each of the setting values (a), (b) and (c). The setting values (a), (b) and (c) are stored in the memory 354, and sent to the A/D converter 312 and the signal processing circuit 313 via the setting value output change-over section 355. As mentioned above, the subdivision pattern signal Sk is fed from the subdivision pattern recognizing circuit 250 to the setting value output change-over section 355. In the case where the signal Sk represents the null subdivision pattern, the setting value output change-over section 355 outputs the predetermined setting values (a), (b) and (c) as long as the radiation image read-out (i.e. the final read-out) is being carried out for a single stimulable phosphor sheet 103. That is, in this case, no change-over of the setting value output is carried out (only a single value is stored for each of the setting values (a), (b) and (c) in the memory 354).

In the case where the signal Sk representing the four-on-one subdivision pattern is received from the subdivision pattern recognizing circuit 250, the signal extracting section 219 of the irradiation field recognizing circuit 220 extracts the preliminary read-out image signals Sp at one of the four subdivisions from the preliminary read-out image signals Sp stored in the frame memory 218, and sends the extracted preliminary read-out image signals Sp to the differentiation processing section 221 and the prospective edge point signal detecting section 222. In the differentiation processing section 221, the prospective edge point signal detecting section 222 and the operating section 223, processing is carried out for the preliminary read-out image signals Sp in said one of the four subdivisions in the same manner as in the case of the null subdivision pattern, and the irradiation field in said subdivision is recognized. Thereafter, the preliminary read-out image signals Sp in the three remaining subdivisions in the four-on-one subdivision pattern are sequentially extracted in a predetermined sequence, and the irradiation fields are recognized at the respective subdivisions.

Therefore, in this case, four sets of the irradiation field signals St are sent to the final read-out control circuit 314, and the final read-out control circuit 314 calculates four setting values a1 to a4, four setting values b1 to b4, and four setting values c1 to c4 which correspond to the respective irradiation field signals St. The setting values a1 to a4, the setting values b1 to b4, and the setting values c1 to c4 are stored in the memory 354. Also, the setting value output change-over section 355 receives the signal Sk representing the four-on-one subdivision pattern from the subdivision pattern recognizing circuit 250. At the time the final read-out is carried out at the final read-out section 30, the setting value output change-over section 355 recognizes the subdivision including the region at which the final read-out is being carried out by, for example, receiving a synchronizing signal Ss which is synchronous with the operations of the light deflector 305 and the sheet conveyance means 320. The setting value output change-over section 355 reads the read-out gain setting value a1, a2, a3 or a4, the scale factor setting value b1, b2, b3 or b4, and the image processing condition setting value c1, c2, c3 or c4, that correspond to the recognized subdivision, selectively from the memory 354, and sends the setting values respectively to the amplifier 311, the A/D converter 312, and the signal processing circuit 313. Therefore, even though the image input information and/or the condition of limitation of the irradiation field is different among the subdivisions, the read-out gain and the scale factor as the final read-out conditions, and the image processing conditions can be adjusted as suitable for the image input information in every subdivision.

In the case where the signal Sx representing the two-on-one subdivision pattern is fed from the subdivision patter recognizing circuit 250 to the signal extracting section 219 of the irradiation field recognizing circuit 20, the setting values a1 and a2, the setting values b1 and b2, and the setting values c1 and c2 are calculated in the same manner as mentioned above. At the time of the final read-out, the setting values are selectively changed over by the setting value output change-over section 355 and are fed out.

In the aforesaid embodiment, in order to discriminate whether the prospective edge points in the sheet regions Fx and Fy stand or do not stand in a straight line, the total number of the picture elements as the prospective edge points in a predetermined direction is investigated. However, for this purpose, it is also possible to employ a method wherein a regression straight line is calculated by the method of least squares or the like for the prospective edge points, and the prospective edge points are judged to be standing in a straight line in the case where the prospective edge points are present in a number not smaller than a predetermined number and the total value of the square errors of the aforesaid straight line and the respective prospective edge points is smaller than a predetermined value. Also, the technique of calculating the straight lines L1 to Ln at the irradiation field contour by the utilization of Hough transformation can be utilized for detecting whether the prospective edge points stand or do not stand in a straight line. Alternatively, conversion into the two-valued system may be carried out by assigning the value "1" to the picture elements between the "−" (minus) edges and the "+" (plus) edges among the prospective edge points in the sheet regions Fx and Fy, and assigning the value "0" to the other picture elements, and the total of such values added up in each of the x axis and y axis directions in FIG. 6 may be utilized for judging whether the prospective edge points stand or do not stand in a straight line.

In the radiation image recording and reproducing system shown in FIG. 1, the preliminary read-out section and the final read-out section are disposed independently. However, as disclosed in, for example, Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveyance means and then the final read-out is carried out. In the preliminary read-out step, the stimulation energy of the stimulating rays is adjusted by a stimulating ray energy adjusting means to be lower than the stimulation energy of the stimulating rays used in the final read-out. The present invention is also applicable to such a case.

Also, instead of recognizing the subdivision pattern based on the preliminary read-out image signals, the subdivision pattern may be recognized by the utilization of the final read-out image signals in accordance with the present invention. In this case, the information on the recognized subdivision pattern can be utilized for, for example, adjusting the image processing condition setting value (c) as suitable for each subdivision.

I claim:

1. A method of recognizing a subdivision pattern of radiation images, which comprises the steps of, in the course of exposing a stimulable phosphor sheet carrying radiation image information of an object stored thereon by radiation image recording to stimulating rays which cause the stimulable phosphor sheet to emit light in proportion to the stored radiation energy, and photoelectrically detecting the emitted light by use of a light detection means to obtain image signals representing the radiation image information:

(i) in the case where subdivision image recording has been carried out by exposing each of a plurality of predetermined subdivisions on said stimulable phosphor sheet to radiation, detecting prospective edge points, which are considered to be an edge of a subdivision line between said subdivisions, from said image signals at a stimulable phosphor sheet region as the boundary between said subdivisions, (ii) discriminating whether said prospective edge points stand or do not stand in a straight line, and (iii) recognizing an image subdivision pattern on said stimulable phosphor sheet by judging that the subdivision line is present in the case where said prospective edge points stand in a straight line, and judging that no subdivision line is present in the case where said prospective edge points do not stand in a straight line.

2. A method as defined in claim 1 wherein said prospective edge points are detected by digitizing said image signals and carrying out differentiation processing of said digitized image signals.

3. A method as defined in claim 1 wherein the step of discriminating whether said prospective edge points stand or do not stand in a straight line is carried out by adding up said prospective edge points in a predetermined direction, and regarding said prospective edge points as standing in a straight line in the case where the maximum total number of said prospective edge points thus calculated is larger than a predetermined value.

4. A method as defined in claim 1 wherein said image signals are obtained by preliminary read-out.

* * * * *